United States Patent [19]
Bollinger

[11] 3,758,559
[45] Sept. 11, 1973

[54] RESOLUTION OF DL-α-METHYLPHENYLALANINE

[75] Inventor: Frederick W. Bollinger, Westfield, N.J.

[73] Assignee: Merck & Co., Inc., Rahway, N.J.

[22] Filed: Jan. 30, 1970

[21] Appl. No.: 7,261

[52] U.S. Cl. .............................. 260/518 R, 424/319
[51] Int. Cl. ............................................ C07c 101/08
[58] Field of Search .................................. 260/518 R

[56] References Cited
UNITED STATES PATENTS
3,517,057  6/1970  Pines et al....................... 260/518 R OTHER PUBLICATIONS
Stein, G.A., et al. J.A.C.S., Vol. 77 (1955), Pages 700 to 703.

Greenstein, J. P. et. al., Chemistry of the Amino Acids, Vol. 1, (1961), Pub. by Wiley & Sons, Inc. Pages 716 to 721

Primary Examiner—Lorraine A. Weinberger
Assistant Examiner—L. Arnold Thaxton
Attorney—Francis H. Deef, Harry E. Westlake, Jr. and L. Louis Wolk

[57] ABSTRACT

DL-α-methylphenylalanine is resolved by the cinchonine and cinchonidine salts to give pure D(+) and L(−) isomers. This resolution results in the isolation of the pharmacological properties exhibited by the DL mixture and further shows a reduction of undesirable side effects.

1 Claim, No Drawings

RESOLUTION OF DL-α-METHYLPHENYLALANINE

SUMMARY OF THE INVENTION

This invention provides a new method for resolving DL-α-methylphenylalanine to obtain the novel D(+) and L(−) compounds. The compounds of this invention have valuable pharmacological properties wherein all catecholamine depleting activity exhibited with DL-α-methylphenylalanine now resides in the L(−) antipode.

BACKGROUND OF THE INVENTION

The preparation of racemic α-methylphenylalanine was previously reported by Gustav A. Stein et al. in the Journal of the American Chemical Society, 77, 700 (1955). The absolute configuration of (+)-α-methylphenylalanine hydrochloride was elucidated to be either R- or D-configuration by the chemical correlation with (−)-α-methylaspartic acid, whose absolute configuration had been confirmed to be R-configuration. This was reported by Shiro Terashima et al. in the Chem. Pharm. Bull., 14 (10) 1138-1143 (1966). These authors also reported the partial resolution of N-acetyl-DL-α-methylphenylalanine through its menthyl esters.

I have found a useful resolution of DL-α-methylphenylalanine which previously has not been completely resolved. When DL-α-methylphenylalanine is resolved into its antipodes, the pharmacological properties exhibited by the DL mixture are unexpectedly separated. The catecholamine depleting activity exhibited with DL-α-methylphenylalanine now resides in the L(−) antipode. Further use for the resolved materials, each of which increases the value of the resolution, will become apparent to one skilled in the art.

DESCRIPTION AND PREFERRED EMBODIMENTS

This invention provides a new method of preparing the novel D- and L-enantiomorphs of DL-α-methylphenylalanine. The resolved materials are obtained as the pure D- and L-amino acids substantially free of the other isomer.

This invention further provides pharmacologically active chemical compounds. This invention also describes the pharmaceutical method of treatment using said isomer as medicinal agents and use in therapeutic compositions.

The compounds of this invention are the novel L(−)-α-methylphenylalanine and its salts. The method herein described provides a convenient and economical procedure for preparation of pure L(−) and D(+)-α-methylphenylalanine. The compounds of this invention are prepared by resolving DL-α-methylphenylalanine by the following preferred procedure.

DL-α-methylphenylalanine is first acetylated. When an alcoholic solution (preferably ethanol) of DL-N-acetyl-α-methylphenylalanine is treated with an alcoholic solution (preferably ethanol) of cinchonidine, a salt of the L(−) antipode precipitates. This salt is then crystallized to constant melting point and rotation. The pure L(−)-N-acetyl-α-methylphenylalanine cinchonidine salt is then decomposed with dilute acid (such as hydrochloric acid) and the N-acetyl group is removed by heating with dilute acid (such as refluxing with 6 N hydrochloric acid). L(−)-α-methylphenylalanine acid salt crystallizes on concentration and cooling. This salt may be used directly or the free amino acid may be isolated and used.

The mother liquors enriched in D(+)-salt are decomposed with dil. acid (such as hydrochloric acid). On treatment of the D(+) enriched N-acetyl-α-methylphenylalanine with cinchonine in alcohol the D(+)-salt crystallizes. This salt is crystallized to constant rotation and decomposed with dilute acid (such as hydrochloric acid) to yield the D(+)-α-methylphenylalanine as the hydrochloride salt. The free amino acid is then isolated.

The absolute configurations L and D (S and R) are assigned by analogy to L(−)-α-methyldopa (L-3-(3,4-dihydroxyphenyl)-2-methylalanine).

This invention may be illustrated by the following reaction diagram:

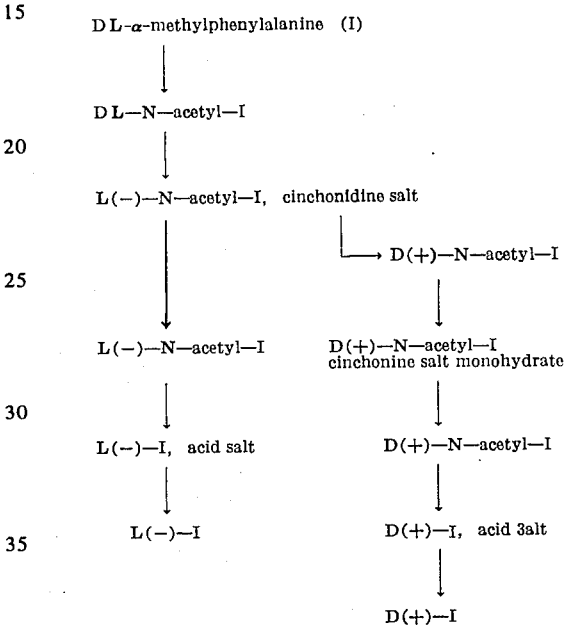

Resolution, as described above, gives pure enantiomorphs in high yields.

Since cinchonidine and cinchonine are mirror images at the most basic portion of these molecules, while diastereomers overall, the resolution can be started with either, but the above order of treatment is preferred.

DL-α-methylphenylalanine has greater effect on heart catecholamines than on brain catecholamines. This property is unexpected since this action is opposite that of L(−)-α-methyltyrosine which depresses brain catecholamines more than heart. It naturally follows, therefore, that in the treatment of heart conditions L(−)-α-methylphenylalanine will cause less drowsiness and less mental depression than L(−)-α-methyltyrosine. Further uses for the L-compound involve the studies of metabolic inhibition and metabolic pathways while the D-compound is useful in the synthesis of antibiotic peptides. Additional uses of pure L(−)- and D(+)-compounds will be apparent to one skilled in the art.

The substantially pure L(−)-α-methylphenylalanine and its pharmaceutically acceptable salts can be normally administered in the same manner as the DL mixture has been administered in the art, that is orally, parenterally or rectally. Orally, they may be administered in tablets, capsules, suspensions or syrups, the optimum dosage depending, of course, on the particular compound being used and the type and severity of the condition being treated. In any specific case, the appropriate dosage selected will further depend on factors of the patient which may influence response to the drug, for example, general health, age, weight, etc. Comparative dosages may be used in parenteral or rectal administration.

Compositions may be prepared according to any method known in the art for the manufacture of pharmaceutical compositions and such compositions may contain one or more agents; for example, sweetening agents, flavoring agents, coloring agents, preserving agents, etc. Further, the active D(+)- or L(−)-compound may be administered alone or in admixture with other active ingredients and/or non-toxic pharmaceutically acceptable excipients. Such excipients may be, for example, inert diluents such as calcium carbonate, lactose, etc.; granulating and disintegrating agents, for example, maize starch, alginic acid, etc.; lubricating agents, for example, magnesium stearate, talc, etc.; binding agents, for example, starch, gelatin, etc.; suspending agents, for example, methylcellulose, vegetable oil, etc.; dispersing agents, for example, lecithin, etc.; thickening agents, for example, beeswax, hard paraffin, etc.; emulsifying agents, for example, naturally-occurring gums, etc.; and non-irritating excipients, for example, cocoa butter and polyethylene glycols.

D(+)-α-Methylphenylalanine is combined with other amino acids to form peptides by methods known to those skilled in the art.

The following are detailed examples which show the preparation of D(+) and L(−)-α-methylphenylalanine. They are to be construed as illustrations of said compounds and process and not as limitations thereof.

DL-N-Acetyl-α-methylphenylalanine

With stirring and warming, 206 g. (0.965 mole) of DL-α-methylphenylalanine hydrochloride are dissolved in 1650 ml. of water and 937 ml. of 10 N sodium hydroxide. The mixture is then cooled to 5°C. and 378 ml. of acetic anhydride are added dropwise with stirring while keeping the temperature 5°–10°C. After addition is ended, stirring is continued for ½ hour while the temperature is maintained at 5°–10°C. With ice-bath cooling, the mixture is acidified to pH 2 by gradual addition of concentrated hydrochloric acid. The mixture is aged 15 hours at 0°–5°C., filtered and the precipitate washed with three 100 ml. portions of cold water and dried in vacuo at 50°C. The product is recrystallized from ethanol-water to obtain pure DL-N-acetyl-α-methylphenylalanine, m.p. 199°–201°C.

Anal. Calcd. for $C_{12}H_{15}NO_3$: C, 65.14; H, 6.83; N, 6.33; Eq. wt. 221.26.

Found: C, 64.95; H, 6.98; N, 6.49; Eq. wt. 222.

L(−)-N-Acetyl-α-methylphenylalanine, Cinchonidine Salt

To a solution of 234 g. (1.058 moles) of DL-N-acetyl-α-methylphenylalanine in 438 ml. of absolute ethanol is added a solution of 312 g. (1.058 moles) of cinchonidine in 438 ml. of absolute ethanol. The mixture is cooled to room temperature, diluted with ether (1930 ml.), seeded with adduct and allowed to stand overnight at 25°. The precipitate is washed with three 75 ml. portions of 3:1 ether:ethanol. After drying in vacuo at 50°, the yield of adduct amounts to 222.5 g., m.p. 207°–210°. Recrystallization from ethanol-ether as before yields 163.0 g., m.p. 215°–216°$[\alpha]_{578}$ $^{23}$ −49.2° (C 1, abs. ethanol). The analytical material is crystallized to constant values, m.p. 218°–219° dec., $[\alpha]_{578}$ $^{23}$ = −47.0° (C 1, abs. ethanol) u/v max. ($CH_3OH$) 225 m$\mu$ (log$\epsilon$4.57), 285 (3.71), 302 (3.59), 315 (3.50).

Anal. Calcd. for $C_{31}H_{37}N_3O_4$: C, 72.20; H, 7.23; N, 8.13.

Found: C, 71.96; H, 7.25; N, 8.27.

L(−)-N-Acetyl-α-methylphenylalanine

To 1750 ml. of water and 131 ml. of 2.5 N hydrochloric acid is added 163.0 g. (0.316 mole) of acetylaminoacid cinchonidine salt and the mixture stirred at 0°–5° for 1 hour. An additional 172 ml. portion of 2.5 N hydrochloric acid is added and the stirring continued at 0°–5° for 1 hour. The mixture is filtered and the precipitate washed with three 75 ml. portions of cold water. After drying at 50° in vacuo the yield of L(−)-N-acetyl-α-methylphenylalanine, m.p. 203°–205°, $[\alpha]_{578}$ $^{23}$ −42.1° (C 1, abs. ethanol), amounts to 64.4 g. The analytical material is recrystallized from acetone, m.p. 206°–207°, u/v max. ($CH_3OH$) 252 m$\mu$ (log $\epsilon$2.17), 257.5 (2.24), 263 (2.09), sh 247.5 (2.00).

Anal. Calcd. for $C_{12}H_{15}NO_3$: C, 65.14; H, 6.83; N, 6.33; Eq. wt. 221.26.

Found : C, 65.17; H, 6.73; N, 6.59; Eq. wt. 222.

L(−)-α-Methylphenylalanine Hydrochloride

To 536 ml. of 6 N hydrochloric acid is added 64.4 g. (0.291 mole) of L(−)-N-acetyl-α-methylphenylalanine. After 6 hours at reflux, the mixture is cooled to room temperature spontaneously then at 15° for 30 minutes. The mixture is filtered and the precipitate is washed with three 25 ml. portions of 2 N hydrochloric acid at 0°–5°. After drying in vacuo at 50°, the yield of L(−)-α-methylphenylalanine hydrochloride amounts to 55.1 g., m.p. 217°–219°, $[\alpha]_{578}$ $^{23}$ −2.10° (C 0.2, 1 N HCl). pH ½ 2.6, u/v max. ($CH_3OH$) 252 m$\mu$ (log$\epsilon$2.24), 258 (2.30), 263 (2.19), sh 247.5 (2.11).

Anal. Calcd. for $C_{10}H_{13}NO_2 \cdot HCl$: C, 55.69; H, 6.54; N, 6.49; Cl, 16.44; Eq. wt. 215.69.

Found: C, 55.99; H, 6.51; N, 6.48; Cl, 16.29; Eq. wt. 215.5.

L(−)-α-Methylphenylalanine

The L(−)-α-methylphenylalanine hydrochloride is dissolved in water and passed over resin, IR-120 ($H_3^+O$ cycle). The column is eluted with water to neutrality and following that with 500 ml. of 1 N ammonium hydroxide. Concentration of the ammoniacal eluate yields crude product, m.p. 290°–291°, dec. sub. The crude L(−)-α-methylphenylalanine is dissolved in 178 ml. of refluxing methanol and upon concentration to about 100 ml., crystallization begins. The mixture is allowed to cool spontaneously and stand overnight at room temperature, chilled to 5°, filtered and the precipitate washed with methanol. After drying at 50° in vacuo, the yield of L(−)-α-methylphenylalanine, m.p. 307.5°, dec. sub., $[\alpha]_{578}$ $^{23}$ −2.5° (C 1, 1 N HCl), u/v max. ($CH_3OH$) 237 m$\mu$, (log $\epsilon$2.02), 252.5 (2.23), 258 (2.30), 264 (2.18), sh 247 (2.13).

Anal. Calcd. for $C_{10}H_{13}NO_2$: C, 66.97; H, 7.31; N, 7.82.

Found: C, 66.86; H, 7.14; N, 7.60.

Enriched D(+)-N-Acetyl-α-methylphenylalanine

By the method previously described, 27.55 g. of enriched D(+)-N-acetyl-α-methylphenylalanine, m.p. 193°–195°, is obtained from the mother liquors of the L(−)-enantiomorph, cinchonidine salt.

D(+)-N-Acetyl-α-methylphenylalanine Cinchonine Salt Monohydrate

Equimolar amounts (0.020 mole) of enriched D(+)-N-acetyl-α-methylphenylalanine and cinchonine are dissolved in 40 ml. of warm ethanol. The mixture is cooled to room temperature, seeded and allowed to stand for 64 hours. After cooling the mixture to 0°, the precipitate is separated by filtration, washed and dried at room temperature. The pure salt monohydrate amounts to 3.25 g., m.p. 116°–118°, $[\alpha]_{578}{}^{27}$ +88.7° (C 2, abs. ethanol). The salt is recrystallized from absolute ethanol with no change in rotation or melting point, u/v max. (CH$_3$OH) 226 m$\mu$ (log $\epsilon$4.54), 285 (3.68), 303 (3.56), 316 (3.49) IR spectrum consistent.

Anal. Calcd. for $C_{31}H_{37}N_3O_4 \cdot H_2O$: C, 69.80; H, 7.37; N, 7.87.

Found: C, 70.00; H, 7.72; N, 7.40.

D(+)-N-Acetyl-α-methylphenylalanine

By the method described for the L(−)-enantiomorph 0.42 g. of D(+)-N-acetyl-α-methylphenylalanine, m.p. 204°–207°, $[\alpha]_{578}{}^{26}$ +42.7° (C 1, abs. ethanol) is obtained. The material is recrystallized from 33 percent ethanol to yield an analytical sample, 0.30 g., m.p. 206°–207°, $[\alpha]_{578}{}^{24}$ +44.0° (C 1, abs. ethanol), u/v max. (CH$_3$OH) 247 m$\mu$, (log $\epsilon$2.03), 252.5 (2.19), 258 (2.26), 263 (6.03), IR consistent, pH ½ 4.95 (50 percent methanol).

Anal. Calcd. for $C_{12}H_{15}NO_3$: C, 65.14; H, 6.83; N, 6.33; Eq. wt. 221.26.

Found: C, 65.43; H, 6.69; N, 6.20; Eq. wt. 222.

D(+)-α-Methylphenylalanine Hydrochloride

By the method previously described, 10.0 g. of D(+)-α-methylphenylalanine hydrochloride, m.p. 217°–219° is obtained. The analytical material, 0.245 g. is obtained by recrystallization from acetone/n-hexane, m.p. 214°–215°, dec. $[\alpha]_{578}{}^{22}$ +2.1° (C 1.2, 1 N HCl), u/v max. (CH$_3$OH)252.5 (log$\epsilon$2.14), 258 (2.21), 264 (2.10).

Anal. Calcd. for $C_{10}H_{13}NO_2 \cdot HCl$: C, 55.69; H, 6.54; N, 6.49; Cl, 16.44.

Found: C, 55.76; H 6.43; N, 6.64; Cl, 16.15.

D(+)-α-Methylphenylalanine

By the method previously described, 7.4 g. of D-α-methylphenylalanine, m.p. 307°–308°, dec. sub., is obtained. This material is recrystallized as was the L(−)-enantiomorph to yield 3.55 g. of product, m.p. 315°, dec. sub., purity by phase solubility $[\alpha]_{578}{}^{23}$ +20.6°(C 1, H$_2$O), u/v max. (CH$_3$OH) 247 m$\mu$ (log$\epsilon$1.99), 252 (2.15), 258 (2.25), 264 (2.12), IR spectrum identical with that of L(−)-compound.

Anal. Calcd. for $C_{10}H_{13}NO_2$: C, 66.97; H, 7.31; N, 7.82.

Found: C, 66.98; H, 7.59; N, 7.84.

DL-α-Methylphenylalanine Hydrochloride

Equimolar amounts (0.88 g., 0.00408 mole) of D(+)- and L(−)-α-methylphenylalanine are dissolved in 15 ml. of concentrated hydrochloric acid and crystallized. The yield of racemic material is 0.75 g., m.p. 241°–244°, racemic at all wave lengths, u/v max. (CH$_3$OH) 252.5 m$\mu$ (log$\epsilon$2.15), 258 (2.28), 264 (2.18), sh 243 (1.88), sh 248 (2.02), sh 267.5 (1.82), IR spectrum identical with that obtained by Stein et al., J. Am. Chem. Soc. 77, 700 (1955).

What is claimed is:

1. A process for the preparation of L(−)-α-methylphenylalanine which comprises, in sequence, the steps of
   a. acetylating a racemic mixture of DL-α-methylphenylalanine with an acetylating agent;
   b. treating the DL-N-acetyl-α-methylphenylalanine mixture with cinchonidine;
   c. crystallizing the cinchonidine salt of L(−)-N-acetyl-α-methylphenylalanine from solution;
   d. decomposiing the cinchonidine salt of L(−)-N-acetyl-α-methylphenylalanine with an acid;
   e. deacetylating L(−)-N-acetyl-α-methylphenylalanine with acid by heating with an acid; and
   f. liberating the pure L(−)-α-methylphenylalanine compound from its acid salt with a base.

* * * * *